United States Patent [19]
Yamaguchi et al.

[11] Patent Number: 5,117,368
[45] Date of Patent: May 26, 1992

[54] CONTROL DEVICE FOR TAPPING

[75] Inventors: Takahiro Yamaguchi; Takahiko Kitade, both of Ooguchi, Japan

[73] Assignee: Kabushiki Kaisha Okuma Tekkosho, Nagoya, Japan

[21] Appl. No.: 501,139

[22] Filed: Mar. 29, 1990

[30] Foreign Application Priority Data

Mar. 29, 1989 [JP] Japan .................................... 1-77856

[51] Int. Cl.⁵ ............................................. G05B 19/24
[52] U.S. Cl. ........................... 364/474.32; 364/474.21; 364/474.3; 364/474.34; 318/571
[58] Field of Search .................. 364/474.15, 474.17, 364/474.21, 474.20, 474.3, 474.31, 474.32, 474.34; 318/39, 571; 408/8-13

[56] References Cited

U.S. PATENT DOCUMENTS

| | | | |
|---|---|---|---|
| 4,353,018 | 10/1982 | Kohzai et al. | 318/571 |
| 4,608,645 | 8/1986 | Niwa et al. | 364/474.17 |
| 4,656,405 | 4/1987 | Kiya et al. | 364/474.32 |
| 4,815,000 | 3/1989 | Yonede et al. | 364/474.32 |
| 4,879,660 | 11/1989 | Asakura et al. | 364/474.3 |
| 4,912,385 | 3/1990 | Kawamura et al. | 364/474.29 |
| 4,941,104 | 7/1990 | Teshima et al. | 364/474.3 |
| 4,985,841 | 1/1991 | Iwagoya | 364/474.31 |

Primary Examiner—Jerry Smith
Assistant Examiner—Thomas E. Brown
Attorney, Agent, or Firm—Wenderoth, Lind & Ponack

[57] ABSTRACT

A tapping device generates a cycle suspension squence by which a tapping process can be temporarily suspended and a cycle restart sequence by which the suspended tapping process can be restarted, thereby securing a safe operation at the time of an abnormality in the tapper or at trial cutting. Tapping wherein tapping is controlled by synchronizing the rotation of a spindle and the feed on a feed shaft. The device includes a sequence generating section which generates a tapping sequence for execution of said the tapping process, a cycle suspension sequence which slows down and suspends in synchronism the rotation of the spindle and the feed on said feed shaft to sumit detachment of the tapper from the work, and a cycle restart sequence which resumes the tapping process. A memory is provided which stores the detected oriented angle of the spindle for the start of cutting in the tapping sequence. A sequence executing section is provided which executes the tapping sequence, the cycle suspension sequence when a cycle suspension signal is inputted, and the cycle restart sequence according to the spindle oriented angle from said memory means when a cycle restart signal is inputted.

3 Claims, 3 Drawing Sheets

CONTROL DEVICE FOR TAPPING

BACKGROUND OF THE INVENTION

The present invention relates to a tapping control device which controls a tapping process by synchronizing the rotation of a spindle and the feed on a feed shaft.

In the prior art tapping control device, tapping is controlled by means of a float tapper without synchronizing the rotation of the spindle and feed on the feed shaft. Once the tapping operation is started, therefore, it is necessary to complete the machining without suspension to avoid possible damage to the thread.

The above mentioned prior art tapping control device is defective in that the tapping process could not be suspended if the operation has been started, for instance, for a wrong hole position instructed by an erroneous command in programming, thereby causing a loss in the machining time and the material. Further, there may arise a danger if tapping cannot be suspended even if an abnormality occurs in the tapper process during the operation.

SUMMARY OF THE INVENTION

The present invention was contrived to solve the aforementioned problems encountered in the prior art, and aims at providing a tapping control device which can control tapping in a manner to freely suspend and/or resume the process during the operation.

According to one aspect of the present invention, for achieving the objects described above, there is provided a control device for tapping wherein tapping is controlled by synchronizing the rotation of a spindle and the feed on a feed shaft, which is characterized in that the device includes a sequence generating means which generates a tapping sequence for execution of a tapping process, a cycle suspension sequence which slows down and suspends the rotation of the spindle and the feed on said feed shaft in synchronization to detach the tapper from the work and a cycle restart sequence which resumes the tapping process, a memory means which detects and stores the oriented angle of the spindle for the start of cutting in the tapping sequence, and a sequence executing means which executes the tapping sequence, the cycle suspension sequence when a cycle suspension signal is inputted, and the cycle restart sequence according to the spindle oriented angle for the start of cutting read out from the memory means when a cycle restart signal is inputted.

The nature, principle and utility of the invention will become more apparent from the following detailed description when read in conjunction with the accompanying drawings.

DESCRIPTION OF THE PREFERRED EMBODIMENT

Figure 1:
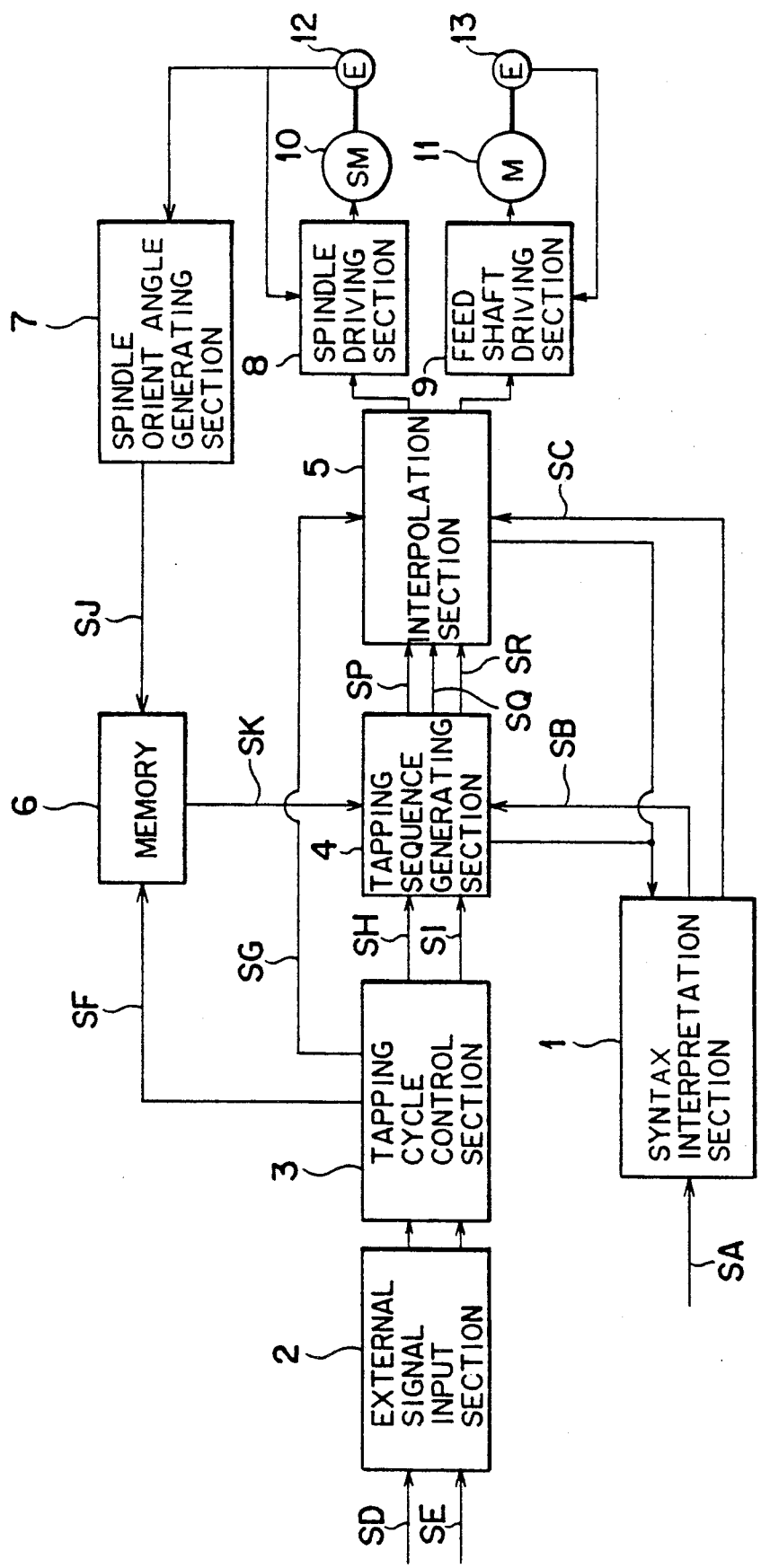
FIG. 1 is a block diagram showing an embodiment of the tapping control device according to the present invention.

FIG. 1 is a block diagram showing an embodiment of the tapping control device according to the present invention. In this device, a command SA of a part program is interpreted by a syntax interpretation section 1, and a tapping cycle command SB is output to a tapping sequence generating section 4 and other commands SC are output to an interpolation section 5. A suspension signal SD and a restart signal SE which have been inputted to an external signal input section 2 from an external switch, for example, are applied to a tapping cycle control section 3. At the start of a tapping sequence, a memory command SF is applied to a memory 6 for the spindle oriented angle for the start of cutting from the tapping cycle control section 3. Further, an interpolation skip signal SG is applied to the interpolation section 5 in response to the suspension signal SD, and a cycle suspension signal SH is applied to the tapping sequence generating section 4. A cycle restart signal SI is transmitted to the tapping sequence generating section 4 in response to the restart signal SE.

When the memory command SF is received by the memory 6 from the tapping control section 3, a spindle oriented angle SJ for the start of cutting which denotes the spindle oriented angle is read out from an encoder 12 via a spindle oriented angle generating section 7 and stored. The stored spindle angle SK is then read out by the tapping sequence generating section 4. The tapping cycle command SB inputted to the tapping sequence generating section 4 from the syntax interpretation section 1 is interpreted to generate a tapping sequence SP, which is then applied to the interpolation section 5. A cycle suspension sequence SQ and a cycle restart sequence SR which begins from the spindle oriented angle SK inputted from the memory 6 are generated in response to the cycle suspension signal SH and the cycle restart signal SI which are inputted from the tapping control section 3, and transmitted to the interpolation section 5. Interpolations are executed in response to the command value SC inputted to the interpolation section 5 from the syntax interpretation section 1, the tapping sequence SP, the cycle stopping sequence SQ and the cycle restart sequence SR from the tapping sequence generating section 4 and the interpolation skip signal SG from the tapping control section 3 in order to control a spindle motor 10 and a feed shaft motor 11 via a spindle driving section 8, the encoder 12 for detecting the spindle position, a feed shaft driving section 9 and an encoder 13 detecting for the feed shaft position.

The tapping sequence SP, cycle suspension sequence SQ and cycle restart sequence SR generated in the tapping sequence generating section 4 will now be explained.

Figure 3:
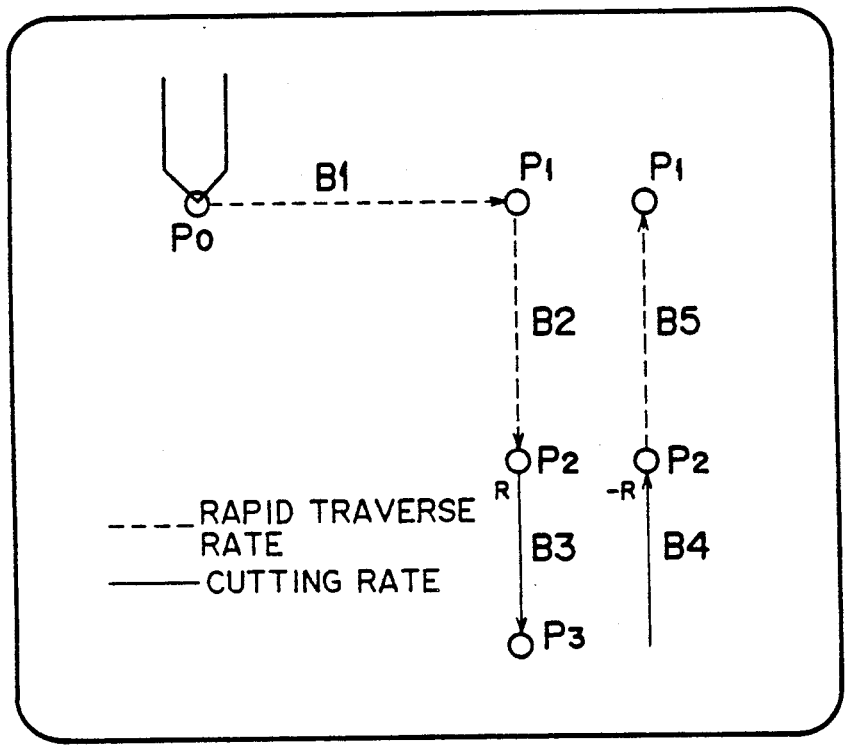
FIGS. 3 and 4 are diagrams respectively to explain the sequences of the tapping operation in the control device according to the present invention.

FIG. 3 shows the tapping sequence SP instructed by the part program which comprises a positioning point $P_1$, a tapping start point $P_2$, a tapping end point $P_3$, the number of revolutions of the spindle R, a positioning block B1, an approach block B2, a tapping block B3, a reverse block B4 and a relief block B5. The positioning block B1, approach block B2 and relief block B5 are executed by rapid traverse rate, and tapping block B3 is executed by cutting rate with synchronous rotation of the spindle with movement of the feed shaft based on the instructed number of rotations of the spindle R. The reverse block B4 is run by cutting rate which is synchronized in the direction opposite to the rotation of the spindle for the tapping block B3.

The cycle restart sequence SR is identical to the tapping sequence SP except for the operation of the tapping block B3 at the tapping start point P2 in FIG. 3. More specifically, the cutting feed is executed in a manner that rotation of the spindle and movement of the feed shaft are synchronized so that cutting may be started at the start point P2 at the spindle angle SK for the start of cutting which is stored i the tapping sequence SP.

Figure 4:
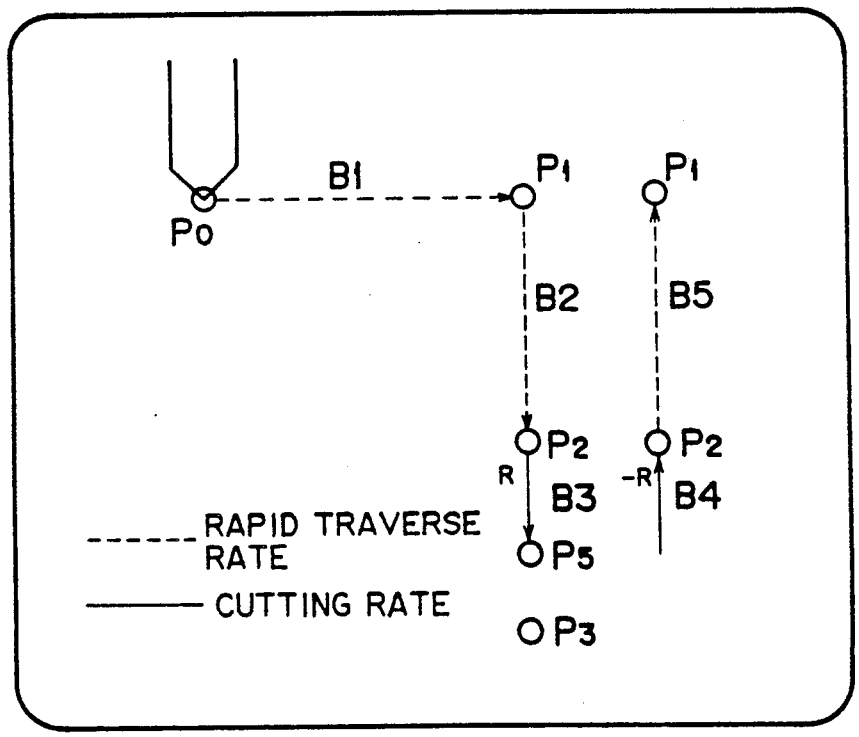

FIG. 4 shows the cycle suspension sequence SQ in correspondence to FIG. 3. When a cycle suspension signal SH is received in the middle of a tapping block B3, the operation is slowed down and suspended at a suspension point P5. Subsequently, the tapper is moved back to the start point P2 by the motion identical to the one (B4') in the block B4, is suspended at the positioning point P1 after having executing relief block B5, and stands by until it receives the cycle restart signal SI.

Figure 2:
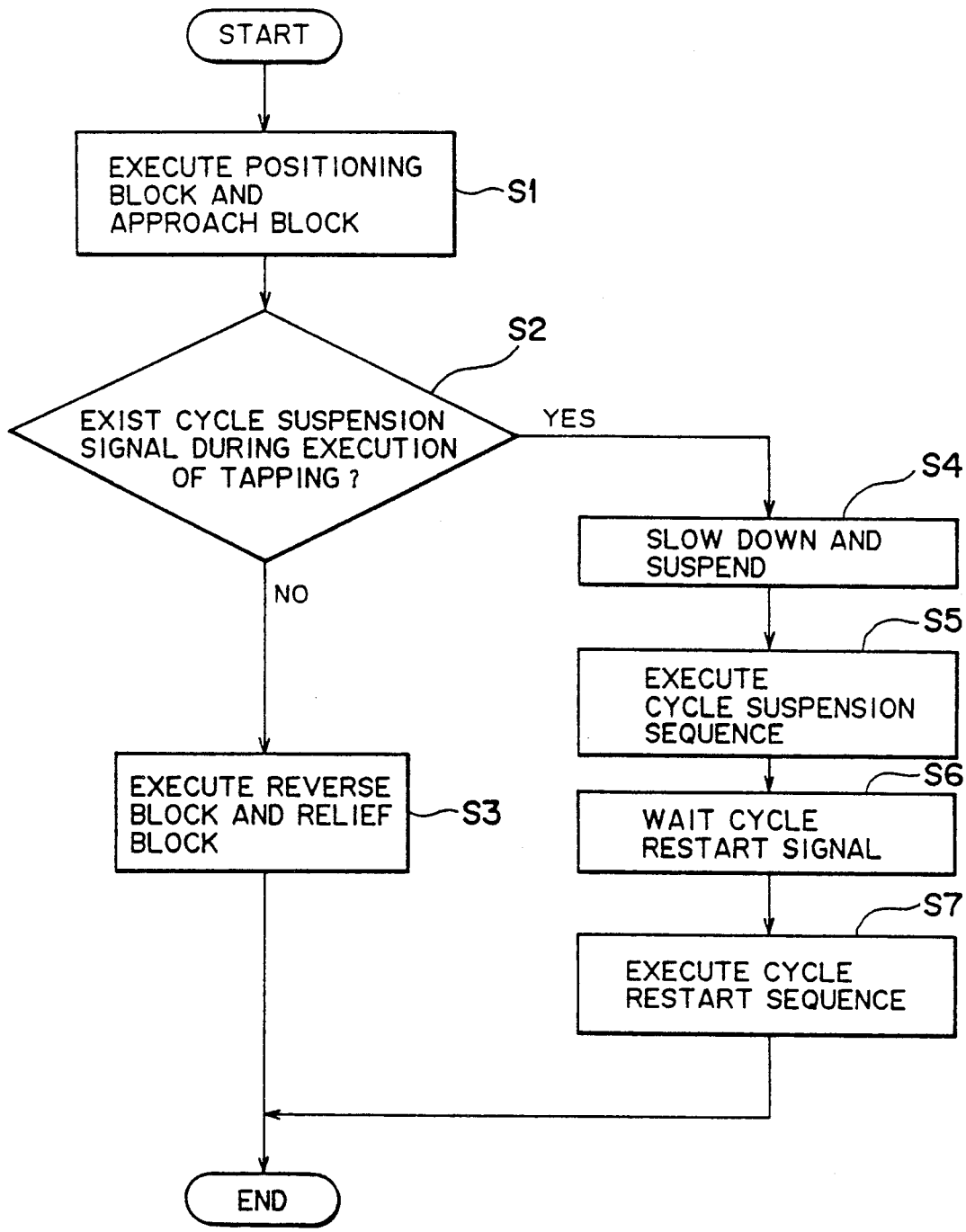
FIG. 2 is a flow chart to explain examples of the operational steps thereof.

Examples of the operation steps in such a construction are explained in FIG. 2 by way of a flow chart. Of the tapping sequence SP, the positioning block B1 and approach block B2 are executed by the interpolation section 5 (Step S1). The tapping block B3 is then executed, and it is decided whether or not the tapping sequence generating section 4 has received a cycle suspension signal SH from the tapping control section 3 for the tapping cycle during the above execution (Step S2). When the tapping sequence generating section 4 has not received a cycle suspension signal SH from the tapping control section 3 by the time tapping block B3 is completed, the reverse block B4 and relief block B5 in the tapping sequence SP are executed (Step S3) to complete the whole process.

In the above mentioned decision Step S2, on the other hand, if the tapping sequence generating section 4 has received a cycle suspension signal SH from the tapping control section 3 in the middle of the tapping block B3, the interpolation section 5 slows down the feed rate in operation and suspends the motion at the suspension point P5 by the interpolation skip signal SG from the tapping control section 3 (Step S4), executes the reverse block B4' and the relief block B5 of the cycle suspension sequence SQ, moves back the tapper to the positioning point P1 (Step S5) and waits until the tapping sequence generating section 4 receives a cycle restart signal SI from the tapping control section 3 (Step S6). When the tapping sequence generating section 4 receives the cycle restart signal SI from the tapping control section 3, the interpolation section 5 executes the cycle restart sequence SR in a manner that the rotation of the spindle and the feed on the feed shaft are synchronized so that cutting be started from the tapping start point P2 at the spindle angle SK which is read out from the memory 6 (Step S7), and the entire machining is completed upon completion of sequence SR.

As has been described, according to the tapping control device of the present invention, machining can be suspended when an error is detected or when any abnormality occurs during the operation to thereby avoid a loss in the machining time and materials, and to prevent a rise in costs and achieve safer machining.

It should be understood that many modifications and adaptations of the invention will become apparent to those skilled in the art and it is intended to encompass such obvious modifications and changes in the scope of the claims appended hereto.

What is claimed is:

1. A tapping control device in which a tapping process is controlled by synchronizing the rotation of a spindle and the feed on a feed shaft, said tapping control device comprising:
    sequence generating means for generating (a) a tapping sequence for execution of said tapping process, (b) a cycle suspension sequence for slowing down and suspending in synchronism said rotation of said spindle and said feed on said feed shaft to permit a tapper to be detached from a work, and (c) a cycle restart sequence for resuming said tapping process;
    memory means for storing an oriented angle of said spindle for a start of cutting in said tapping sequence; and
    sequence executing means for executing (a) said tapping sequence, (b) said cycle suspension sequence when a cycle suspension signal is inputted thereto, and (c) said cycle restart sequence according to the spindle oriented angle read out form said memory means when a cycle restart signal is inputted thereto.

2. A control device according to claim 1, wherein said generating means comprises:
    syntax interpretation means for interpreting commands of a part program;
    tapping cycle control means for generating said cycle suspension signal and said cycle restart signal in response to an external signal input means; and
    tapping sequence generating means for receiving a tapping cycle command from said syntax interpretation means and said cycle suspension signal and said cycle restart signal from said tapping cycle control means.

3. A control device according to claim 2, wherein said sequence executing means comprises:
    interpolation means for receiving command values form said syntax interpretation means, said tapping sequence, said cycle stopping sequence and said cycle restart sequence from said tapping sequence generating means and a function generation skip signal from said tapping cycle control means;
    first driving means for driving said spindle and second driving means for driving said feed shaft according to outputs from said interpolation means; and
    data generating means for detecting said oriented angle of said spindle and for outputting the detected spindle oriented angle to said memory means.

* * * * *